May 29, 1934.  J. C. BAKER  1,960,615
MEASURING AND CONTROLLING APPARATUS
Filed June 25, 1929  3 Sheets-Sheet 2
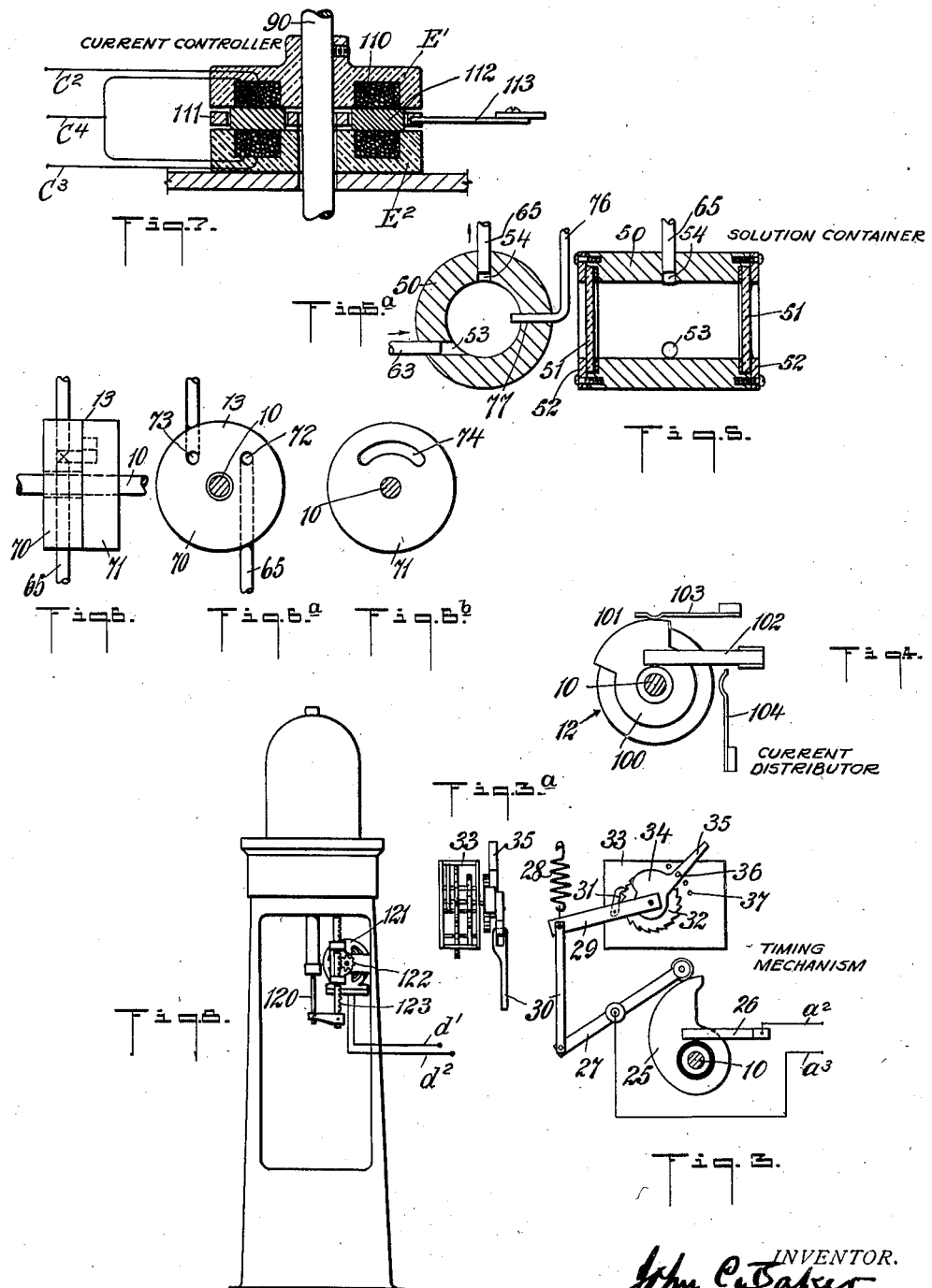

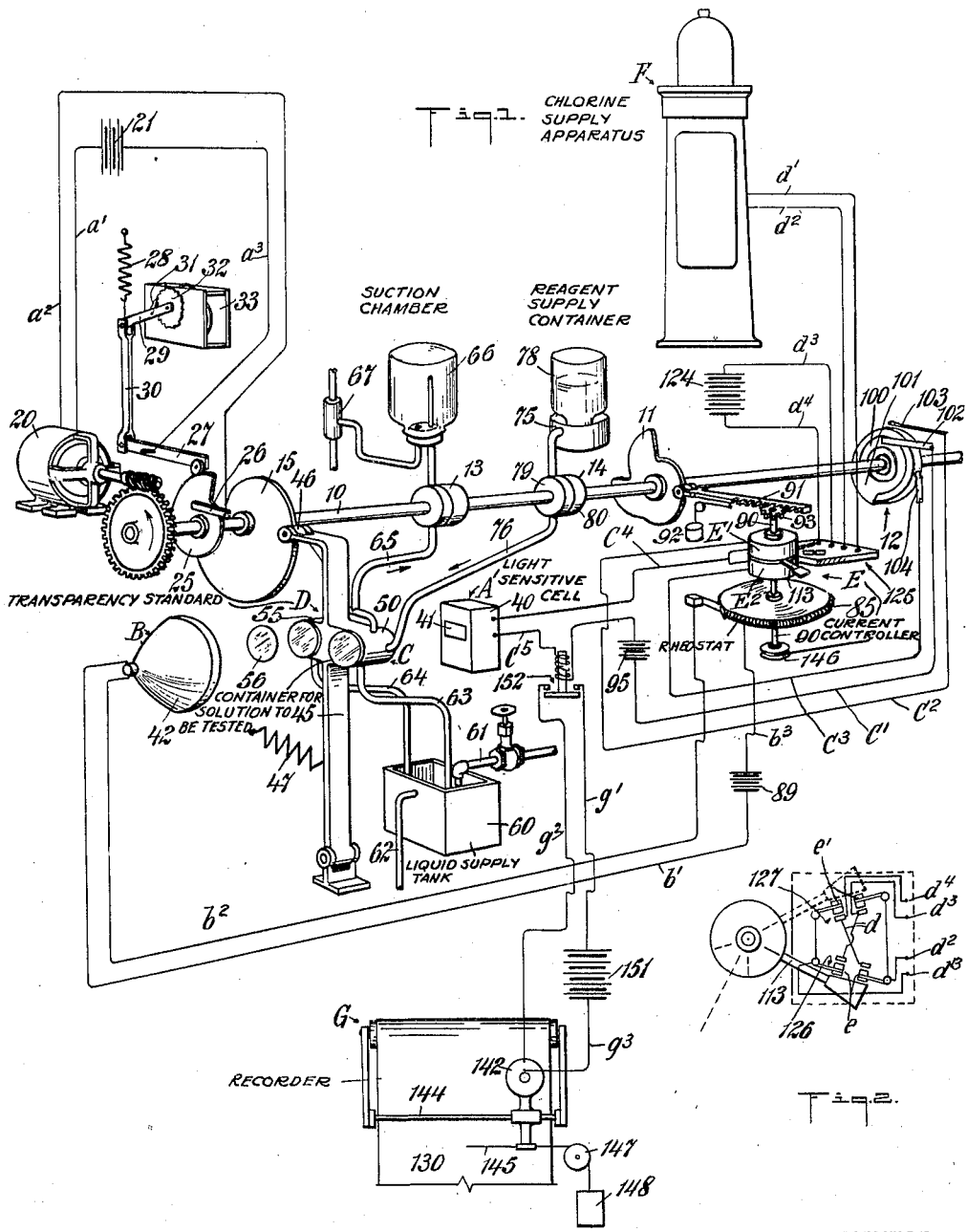

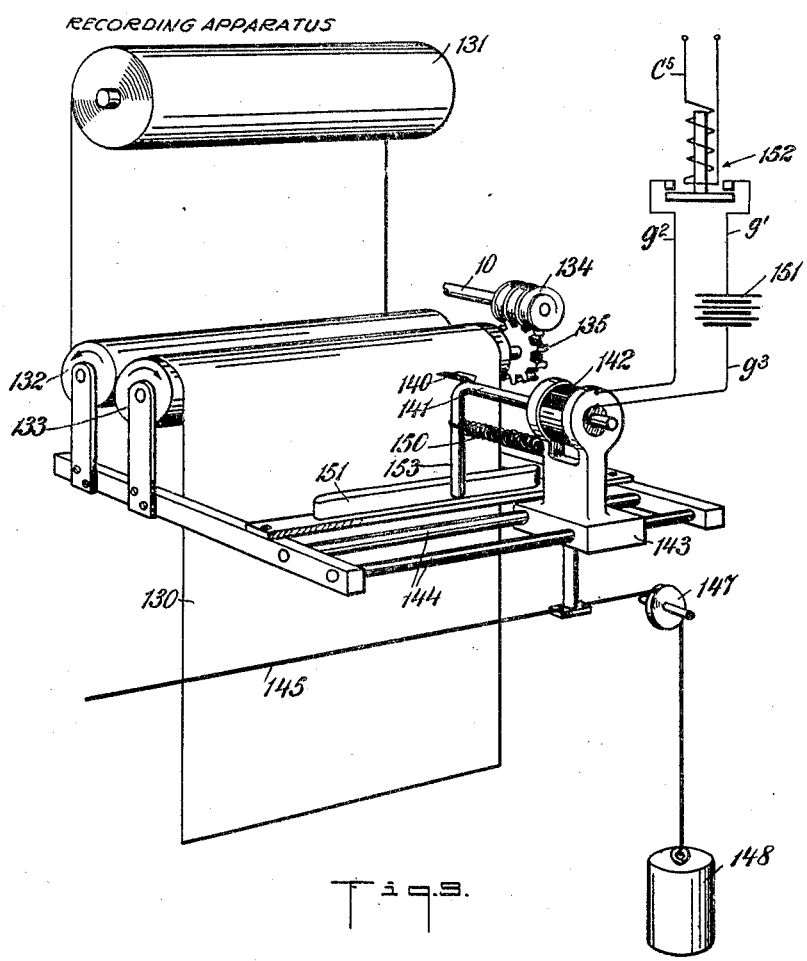

Patented May 29, 1934

1,960,615

UNITED STATES PATENT OFFICE 1,960,615

MEASURING AND CONTROLLING APPARATUS

John C. Baker, Montclair, N. J., assignor to Wallace & Tiernan Company, Inc., Belleville, N. J., a corporation of New York Application June 25, 1929, Serial No. 373,676

5 Claims. (Cl. 23—253)

This invention relates to measuring and controlling apparatus for measuring the amount of a treating agent in flowing water and for controlling the supply of the treating agent to the water. The invention has been made more particularly with the idea of providing a method and means whereby the addition of chlorine gas to flowing water for the purpose of sterilization may be accurately controlled according to the varying requirements of the water.

The invention comprises an apparatus wherein the residual chlorine content of the treated flowing water is tested periodically by measuring by means of a light-sensitive cell the degree of transparency of the water to which a color developing reagent has been added as compared to a standard, and the supply of chlorine to the water is adjusted to increase or decrease the rate of supply according to a less or a greater degree of transparency of the treated water as compared to the standard. The control of the rate of chlorine supply to the water may be manual, according to a showing of the comparative measurement of transparency, or, specifically, the difference in transparency between the treated water and the standard, such showing being by means of a record or other suitable indication. Most desirably, however, the rate of chlorine supply is controlled automaticaly according to the excess or deficiency of residual chlorine in the water to remedy such condition and maintain the amount of residual chlorine constant or approximately so. The invention also includes apparatus for carrying out the method.

In the chlorination of water flowing through a conduit or main, such as the water of city and town water supplies, the rate of supply of the chlorine is commonly varied proportionately to variations in the amount of water to be treated flowing, and apparatus for automaticaly accomplishing such control and variation in the supply of chlorine is in common use. The amount of chlorine required to be added to the water also varies, however, according to variations in the amount and character of substances in the water, or, as it may be stated, according to variations in the composition of the water. Best results in the treatment of water with gaseous chlorine are secured by supplying such amount of chlorine to the water as will result in a constant proportionate amount of unconsumed chlorine present in the water after a given short interval of time. Such remaining unconsumed chlorine is referred to as residual chlorine. The absence of residual chlorine at this time in the water indicates in- complete sterilization. More than a very small amount of residual chlorine is objectionable, because of imparting a chlorine taste to the water. With a given rate of supply of chlorine to a body of flowing water, change in the rate or amount of water flowing or change in the composition of the water will affect the amount of residual chlorine in the water, and a comparatively small change in the rate of water flow or in the composition of the water will cause a comparatively large change in the amount of residual chlorine. Measurement of the residual chlorine in the treated water and control of the rate of supply of the chlorine to the water to maintain the residual chlorine constant thus affords a very accurate way of maintaining the proper rate of chlorine supply under variations in both the amount of water flowing and in the character or composition of the water.

The object of the present invention, considered from the standpoint of controlling the rate of supply of chlorine to flowing water, is to provide a method and means for accurately measuring variations in the residual chlorine in the water from a standard amount and controlling the rate of supply of chlorine to the water being treated so as to maintain the desired amount of residual chlorine in the treated water. In order that the amount of residual chlorine in the water may be measured photometrically, I add to the test samples of the treated water a proportionate amount of a suitable reagent, preferably the ortho-tolidin solution commonly used in the colorimetric testing of chlorinated water, which, reacting with the unconsumed chlorine in the water, develops a characteristic yellow color in the water. The degree of transparency, or light permeability, of the treated water to which the color developing reagent has been thus added is measured by means of a light-sensitive cell subjected to light passed through a body of the treated water of a given thickness, the measure of the transparency of the water being a measure of the amount of residual chlorine therein. The yellow color developed by the reaction between ortho-tolidin and chlorine is highly effective in preventing transmission of the light rays which affect a light-sensitive cell.

To avoid error in the measurement, which might result from any one of a number of factors, such as change in the intensity or position of the light source, change in the temperature of the cell, or change in voltage of the current applied to the cell, I test the treated water periodically and make each test in comparison with a color or transparency standard which has the same degree of transparency as a certain depth or thickness of the treated water having the desired residual chlorine content to which certain proportionate amount of the color-developing reagent has been added. For such standard, I employ a piece of colored glass or other suitable light intercepting member having the degree of light permeability that the body of the color-developed treated water having the desired residual chlorine content would have if the water before treatment were clear, and to compensate for variations in turbidity or other conditions of the treated water affecting its transparency, I use in line with the color standard or light-intercepting member a body of the treated water of equal thickness as the body to be tested taken from the main flow at the same time but without the addition of the color-developing reagent.

Although the invention in its broader aspects is not limited to the use of any particular kind of light-sensitive cell, or to the use of any one variable as the measure of the degree of transparency, I prefer to use, and certain features of the invention consist in the use of, a cell of the kind generally known as a photo-electric glow tube. A cell, or tube, of this kind passes no current until it is subjected to a definite degree of illumination and a definite impressed voltage, that is, the passage of current by the cell depends on two factors: the degree of illumination and the applied voltage. With either factor constant, there is a critical value of the other at which the cell comes into action. Either may be taken as the variable quantity to serve as the measure of the transparency of a body interposed between the light source and the cell. When a cell of this kind does come into action, the flow of current begins sharply and suddenly and reaches a rather large relative value in comparison to the current passed by the ordinary photo-electric cell, which, starting from no light and no current flow, gives increasing flow of current with increasing illumination.

In an apparatus provided with a cell of this kind, I have found it best to make use of varying illumination of the cell as the measure of transparency of the liquid being tested. The apparatus is provided with a single photo-glow tube and is arranged to make a succession of comparative tests of successively taken samples of the treated water by first subjecting the tube to light from a source of gradually increasing intensity passed through the standard of comparison, and then directly afterwards subjecting the tube to light from the same source increasing at the same rate passed through the unknown, that is, the color-developed treated water to be tested. The tube, during each part of each such comparative test, is under the same impressed voltage. The intensity of the light source at which in each case the tube comes into action and passes current corresponds to the degree of transparency of the interposed body being tested, and the movement of a part such as the arm of a rheostat which controls the intensity of the light is a measure of the transparency.

The difference in transparency between the standard and the unknown will thus correspond to the difference in residual chlorine content of the water tested from the desired chlorine content to which the standard corresponds.

If the apparatus is to be employed in connection with apparatus for supplying chlorine, or, it might be, other treating agent, to flowing water for controlling automatically the rate of chlorine supply to maintain a constant residual chlorine content, I provide a controlling means having a member which is moved according to movement of the rheostat arm or other light-controlling part, and the movement of which is also controlled by the passing of current by the tube, and such controlling means serves to cause a variation in the rate of supply of the treating agent after each test operation of the apparatus which shows a deviation in the amount of residual chlorine content from the desired amount of that corresponding to the standard, the rate of supply being increased for a minus deviation and being decreased for a plus deviation. The control means is most desirably constructed to cause each such adjustment of the rate of supply of the treating agent to be roughly proportionate to the amount of deviation from the desired residual chlorine content but preferably somewhat less than would result in an adjustment to the desired rate at one operation.

The complete apparatus comprises a container having opposite transparent walls for the sample or body of the treated water to be tested, means for removing the water from and for refilling the container with a new sample before each test operation, and means for introducing into each sample of water to be tested the proper proportionate amount of ortho-tolidin solution or other color-developing reagent; a transparency standard which includes a similar container and means for re-filling this container for each test with some of the same water with which the first container is filled, but without any color-developing agent; and means for positioning the standard and the container for the water to be tested successively between the light and the photoglow tube. The comparative tests are made periodically at suitable short intervals of time, and the apparatus as a whole is most desirably periodic in its operation.

Instead of having the apparatus automatically control the rate of supply of chlorine gas to the flowing water, the apparatus may be constructed to show, as by making a suitable record or by other indicating means, the variations in the residual chlorine content from that desired, manual adjustment being depended on for effecting the necessary changes in the rate of supply to maintain the desired residual chlorine content. The invention includes the combination with the testing and measuring apparatus of recording means, and the apparatus is most desirably also provided with such means when constructed for effecting automatic adjustment of the rate of chlorine supply.

The transparency standard used in the apparatus determines the residual chlorine content of the treated water to which adjustment is made automatically by the machine or manually. In order to maintain a different residual chlorine content, that is, to change the chlorine dosage, it is only necessary to use a standard of a different degree of transparency or color intensity.

While the invention has been made more particularly with the idea of providing, and in some of its features relates especially to, an improved method and means for controlling the supply of chlorine gas to flowing water, it is to be understood that the invention in its broader aspects is not limited to such use but that it is adapted and may be used for testing and controlling the concentration of other chemicals and other substances.

In the accompanying drawings, I have illustrated an apparatus for use in practicing my method in the chlorination of flowing water and embodying the apparatus features of the invention. In said drawings:—

Fig. 1 is a diagrammatic perspective view and wiring diagram of a complete apparatus according to the invention;

Fig. 2 is a diagrammatic plan view of the controller and the reversing switch operated by the controller;

Fig. 3 is a detailed end view of the timing mechanism for controlling the operation of the main shaft of the apparatus;

Fig. 3ª is a view looking from the left of Fig. 3 showing the clockwork mechanism and associated parts;

Fig. 4 is a detailed end view of the current distributor looking from the right in Fig. 1;

Fig. 5 is a longitudinal sectional view of the container for the water to be tested;

Fig. 5ª is a transverse sectional view of the same container;

Fig. 6 is a view in side elevation of the valve for controlling the suction line between the water containers and the suction chamber;

Figs. 6ª and 6ᵇ are face views of the stationary and rotary members of said valve;

Fig. 7 is a sectional view of the controller;

Fig. 8 is a view of the chlorine supply apparatus showing the means controlled by the testing apparatus for adjusting the rate of chlorine supply; and Fig. 9 is a perspective view of the recording apparatus.

The apparatus shown is intended especially for testing the residual chlorine in treated flowing water, for making a record of each test, and for adjusting the chlorine supply apparatus in accordance with the results of the tests to increase the rate of supply after each test which shows a deficiency and to decrease the rate of supply after each test which shows an excess amount of residual chlorine.

The complete apparatus illustrated comprises a light-sensitive cell A, a source of light B, and a container C for the solution or liquid to be tested adapted to be positioned in line between the light source and light-sensitive cell; also, a transparency standard D, a controller E by which the electric current to the light source is controlled and which is controlled by current passing through the light-sensitive cell for controlling the chlorine supply apparatus to vary the rate of chlorine supply in accordance with variation in the residual chlorine content of the treated water as determined by comparative tests made by the apparatus, and a chlorine supply apparatus F, and a recorder G. Various moving parts of the apparatus receive their movement from a timing shaft 10 which is given a periodic rotation, making in the apparatus shown one complete rotation at each operation and resting for a definite period between successive rotations. The shaft carries a cam 11 by which the controller is driven, a distributor 12 which controls the circuits connecting the light-sensitive cell with the controller E, a valve 13 controlling a suction line through which suction is applied to empty and refill the solution container C and the liquid container of the transparency standard D hereinafter described, a valve 14 for controlling a supply line through which ortho-tolidin solution or other reagent is supplied to the solution container C, and a cam 15 by which the container C and the transparency standard are positioned between the light source and the light sensitive cell.

The timing shaft 10, as shown, is driven by an electric motor 20 which receives current from a suitable source indicated as a battery 21. The motor circuit is controlled by timing mechanism which after each rotation of the shaft operates to open the motor circuit and to maintain the circuit open for a predetermined period, at the end of which it again closes the circuit to cause the motor to operate to drive the shaft for another complete rotation. The timing mechanism comprises a circuit-controlling cam 25 of conducting material mounted on the shaft 10 and insulated therefrom. A contact 26 bears against one face of the cam in position to make continuous contact in all positions of the cam, and a pivoted contact arm 27 rides on the periphery of the cam. The battery 21 or other source of current and the contact members 26 and 27 are connected in series by wires $a^1$, $a^2$ and $a^3$, so that when the contact arm 27 is in contact with the cam 25 the motor circuit is closed, and when the contact arm 27 is out of contact with the cam, the circuit is open. At each rotation of the shaft, cam 25 turns the arm 27 on its pivot against the tension of a spring 28 and at the same time swings a pivoted arm 29 which is connected to the arm 27 by a link 30 and which carries a pawl 31 which normally engages a ratchet wheel 32 carried by a shaft of a clockwork train 33.

When the high point of the cam moves from under the end of the arm 27 and the spring 28 tends to swing the arm back so as to bring its end into engagement with the low part of the cam, such movement of the arm is prevented by engagement of the pawl 31 with the ratchet wheel 32. The spring 28, however, then acts as the driving spring of the clockwork mechanism, resulting in a slow-turning movement of the ratchet wheel whereby the arm 29 is permitted to swing slowly back and the arm 27 is returned slowly to carry its contact end toward the low part of the cam. Such slow return movement of the contact arm 27 continues until the end of the arm again makes contact with the cam 25 or until the pawl 31 is turned out of engagement with the ratchet wheel by riding on a release cam 34. When the pawl is thus moved out of engagement with the ratchet wheel, the spring immediately swings the contact arm into engagement with the cam 25, thus again enclosing the motor circuit and causing an operation of the motor to rotate the shaft through another revolution. In order to provide for varying the length of time during which the shaft remains at rest between its periodic rotations, the release cam 34 is made adjustable as shown, being pivotally mounted on the shaft which carries the ratchet wheel 32 and being provided with an adjusting arm 35 which carries a pin 36 adapted to take into any one of a number of closely spaced holes 37 in the side plate of the clockwork mechanism. Obviously, any suitable means might be provided for periodically rotating the shaft 10 at adjustably variable intervals.

The light-sensitive cell is of the kind above referred to, known as a photo-electric glow tube, and is represented conventionally by a casing or box 40 in which the tube is mounted in the customary manner and which has in one side a window 41 through which light may be projected on the tube. The source of light B is indicated in Fig. 1 by a reflector 42 within which is mounted an incandescent light bulb and which is positioned so as to direct rays of light through the window 41 onto the photo-glow tube.

The solution container C and the transparency standard D are movably mounted so as to be successively interposed between the light source and the light-sensitive cell. For this purpose, they are, as shown, carried by a support 45 pivoted at its lower end and having at its upper end a roll 46 engaging the cam 15 by which at each rotation of the shaft 10 the support is moved against the force of a spring 47 to carry first the transparency standard into position to intercept rays passing from the light source to the cell and then to bring the container C into the same light-intercepting position.

The solution container C is formed by a hollow cylinder 50 of hard rubber or other suitable material resistant to the treated water having its opposite ends closed by plates 51 of clear glass suitably packed and held in place by clamping rings 52. The cylinder is mounted on the support 45 with its longitudinal axis extending parallel to the line between the light source and the cell A. It is provided with an inlet port 53 and an outlet 54.

The transparency standard D comprises a container 55 similar to and of the same size as the container C, provided with an inlet and an outlet, and mounted on the support 45 adjacent and parallel to the container C and at the same radial distance from the pivotal axis of the support; and a light-intercepting member which with the uncolored treated water in the container 55 will intercept light from the light source to the same degree as the treated water in the container C to which color developing reagent has been added when such water contains the desired amount of residual chlorine. I find it most convenient to use as the light intercepting member a piece of colored glass 56 of the color developed in the treated water and of the proper color intensity. This glass is shown in Fig. 1 for clearness as spaced off from the end of the container 55, but in practice the glass may be mounted on the end of the container.

At each revolution of the shaft 10 the support 45 is moved by the cam 15 first to move the transparency standard D into light-intercepting position and hold it in such position for a determined interval, and then to move the container C into light-intercepting position and hold it there for the same interval. Then, before the shaft completes its rotation, the water is drawn from the two containers and the two containers are refilled from a new sample of the treated water and a determined amount of ortho-tolidin solution is supplied to develop the characteristic yellow color in the water in the container C. The intensity of the color developed in the water in the container C will be in proportion to the amount of residual chlorine in the water.

The emptying and refilling of the containers and supply of the ortho-tolidin solution is accomplished by the following means in the apparatus shown. A constantly changing supply of the treated water is maintained in a small tank 60 by a minor flow of the treated water diverted from the main flow through a small pipe 61 which discharges into the tank. The tank is provided with an overflow outlet from which a pipe 62 leads back to the main flow or to any desired place of discharge. A pipe 63 leads from the tank 60 to the inlet port 53 of the solution container C and a pipe 64 leads similarly to the inlet of the standard container 55. From the outlet port 54 of the container 50 and from the outlet of the container 55, connection is made to a pipe 65 which leads to a suction chamber 66 and which is controlled by the valve 13. The suction chamber is connected to a water aspirator 67 which operates to maintain a partial vacuum in the suction chamber and to withdraw any liquid which may enter the chamber. The aspirator may be of any suitable form and supplied with water from any suitable source. It does not need to be of large capacity since the water in the containers is changed only periodically and only a small volume is moved at each change.

When the valve 13 is open, the suction of the vacuum in the chamber 66 causes a flow through the pipe 65, containers C and 55 and pipes 63 and 64, withdrawing from the containers the water which was in them during the previous test cycle and filling them each with a new sample of water from the tank 60. As water is continually flowing through the tank 60, samples taken at any time from the tank represent the water in the main flow at approximately the time at which the samples are thus taken. The valve 13 is formed to open the pipe 65 once in each cycle of operations, that is, at each complete rotation of the timing shaft 10, and for a sufficient time to completely withdraw the water which was in the two containers and to refill them with fresh water. The valve may be of any suitable construction. As shown (see Figs. 6a and 6b), it comprises a stationary disc 70 and a rotary disc 71 mounted on the shaft 10 with one face running against the face of the stationary disc 70. The stationary disc 70 is connected between two parts of the pipe 65, the part of the pipe leading from the containers connecting to a port 72 in the face of the disc and the part of the pipe leading to the suction chamber connecting from a port 73 in the face of the disc. The rotary disc 71 has formed in its contacting face a slot 74 so positioned and of such length as to connect the ports 72 and 73 for a short interval during each rotation of the timing shaft. The opposed surfaces of the two valve members are formed to fit tightly so that little or no leakage occurs. The stationary member 70 may be supported by any suitable means.

The inlet port 53 of the container C is most desirably formed to cause the inflowing water to enter the cylindrical container tangentially and thereby set up a swirling movement of the water within the container to remove air bubbles adhering to the glass faces, and the period during which the valve 13 opens the suction line through the pipe 65 is of sufficient duration so that the amount of water drawn into the suction chamber at each refill operation is somewhat more than the amount which the container will hold. A complete change of the water and refilling with fresh water is thus assured at each refill operation.

After each refilling of the container C with a fresh charge of the treated water to be tested, a fixed amount of ortho-tolidin solution is supplied to the container from a supply container or tank 75. A pipe 76 leads from the supply tank 75 to an inlet opening 77 in the wall of the container C, and the flow of solution through this pipe is controlled by the valve 14 which is operated once at each rotation of the timing shaft 10, after the containers C and 55 have been refilled with fresh water. The tank 75 is most desirably suitably elevated as shown in Fig. 1 to provide a gravity flow of the solution, and it should be a constant level tank of any suitable kind. It may, for example, be supplied from an inverted jar 78, as shown. The valve 14 may be of a construction similar to the valve 13, comprising a stationary member 79 and a rotary member 80 provided with ports formed to permit a pre-determined flow of the solution through the pipe 76 at one part of each revolution of the shaft 10. This tank and valve must be made of acid-resistant material such as hard rubber, bakelite, silver or glass.

The controller E comprises a rotary rheostat 85 and an electro-magnetic controlling device by which an adjusting means for regulating the rate at which chlorine gas is supplied to the flowing water is controlled. The rheostat 85 is connected in a circuit comprising conductors $b^1$, $b^2$ and $b^3$ by which current is supplied to the lamp of the light source B from a current source represented as a battery 89. The rheostat is mounted on a shaft 90 which is oscillated by means of the cam 11 on the timing shaft 10 through a rack bar 91 which is reciprocated by the cam against the force of a weight 92 and which turns a pinion 93 on the end of the shaft 90. The cam 11 is formed to impart to the shaft 90 and rheostat 85 two complete reciprocations, each through an arc of about 300 degrees, during a part of each revolution of the shaft 10. At each reciprocation of the rheostat, the resistance in the lamp circuit is reduced proportionately to the movement of the rheostat so as to correspondingly increase the intensity of the light source.

The light-sensitive cell A is connected in a circuit which is supplied from a current source represented as a battery 95 and which includes one or another of the magnets $E^1$ and $E^2$ of the electro-magnetic controlling device as determined by the distributor 12. The distributor 12 is formed to connect the magnet $E^2$ in circuit with the cell A during the first current-increasing movement of the rheostat 85 in each cycle of operations, and to connect the magnet $E^1$ in circuit with the cell A during the second current-increasing movement of the rheostat in each cycle.

The distributor 12 may be of any suitable construction. As shown, it comprises a rotary disc 100 mounted on the shaft 10 having a segmental contact portion 101. A contact finger 102 makes continuous contact with one face of the disc, and two contact fingers 103 and 104 are positioned to be engaged successively by the periphery of the segmental portion 101. Wire $C^1$ leads from one side of the battery to contact member 102. Contact member 103 is connected by wire $C^2$ to the magnet $E^1$ and contact member 104 is connected by wire $C^3$ with the magnet $E^2$. From each of the magnets connection is made by wire $C^4$ to one terminal of the cell A, and from the other cell terminal connection is made by wire $C^5$ back to the battery. When the contact segment 101 of the distributor engages the contact member 103, therefore, the circuit of the cell A will be completed through the magnet $E^1$, and when the contact segment of the distributor engages the contact member 104, the circuit will be completed through the magnet $E^2$.

The electro-magnetic controlling device comprises two similar electro-magnets $E^1$ and $E^2$ mounted one above the other with their adjacent faces slightly spaced apart. The magnets are of circular construction, made of soft iron, each with a groove in which is located a coil 110. The lower magnet $E^2$ is stationarily mounted, but the upper magnet $E^1$ is mounted on and secured to turn with the shaft 90. Between the two magnets there is an armature 111 which as shown comprises a frame of non-magnetic material in which are set armature pieces 112 of soft iron and which carries an arm 113 extending outward therefrom. The frame is free to turn about the shaft 90, and the frame and armature pieces are of such thickness as to permit relative movement between the frame and either magnet when the frame is held by the other magnet.

The armature will thus move with the magnet $E^1$ when $E^1$ is energized and will be held stationary when $E^2$ is energized even though $E^1$ is then turning. The design of the magnets is such that after the circuit for either magnet is broken, a residual magnetism will be maintained in the magnet for a time. Therefore, if after magnet $E^1$ has been energized and its circuit broken and before magnet $E^2$ is energized, magnet $E^1$ is turned, the armature will move with it until magnet $E^2$ is energized and holds the armature against being moved by the remaining residual magnetism of $E^1$. The magnetic fields of the two magnets are electrically opposed, so that when either magnet is energized any residual magnetism of the other is largely reduced.

In the first part of each rotation of the timing shaft 10, magnet $E^1$ moving with the rheostat 85 makes two complete reciprocations each through an arc of about 300°. When, in each cycle of operations, the magnet $E^1$ starts on its first reciprocation, it having been the last one to be energized, the armature because of its residual magnetism will be turned with this magnet. During this first forward reciprocation of the magnet $E^1$ the magnet energizing circuit through the light-sensitive cell A will be completed by the distributor 12 through the magnet $E^2$. When the light source B controlled by the rheostat 85 has been increased sufficiently so that the light rays passing through the transparency standard D illuminate the cell A to the critical point, the cell will pass current and the magnet $E^2$ will be energized and will hold the armature against further rotation. The magnet $E^1$ will then continue its forward reciprocation and return and will then start its second reciprocation, the contact segment of the distributor 12 having meanwhile moved from the contact member 103 and into contact with the member 104, thereby connecting the cell circuit through magnet $E^1$; also, the container support 45 will have been shifted to move the container C into position between the light source and the cell A in place of the transparency standard D.

As the magnet $E^1$ starts on the forward movement of its second reciprocation, the armature will be held by the residual magnetism of magnet $E^2$ and will be so held until the intensity of the light source by movement of the rheostat 85 has been raised to the degree at which the rays passing through the container C illuminate the cell A to the critical degree, whereupon the cell will again pass current and magnet $E^1$ will be energized. When this magnet is energized, it immediately attracts the armature and carries it forward during the remainder of the forward movement of its second reciprocation. If the degree of transparency of the liquid in the container C is the same as that of the transparency standard, then the magnet $E^1$ will be energized when it has made the same angular movement as it had made in the forward movement of its first reciprocation when the magnet $E^2$ was energized, and the total forward movement given to the armature during the two forward reciprocatory movements of magnet $E^1$ will equal the forward movement of the magnet at each reciprocation. If, however, there is an excess of residual chlorine in the water being tested, so that the transparency of the liquid in the container C is less than that of the transparency standard, then the critical illumination of the cell A will not occur until the rheostat and the magnet $E^1$ have made a greater angular movement in their second reciprocation than that made up to the time that the magnet $E^2$ was energized during the forward movement of their first reciprocation. Consequently, in this case, the armature will not be picked up by the magnet $E^1$ on its second reciprocation until the magnet has made a greater angular movement than it had made on its first reciprocation when the armature was stopped by magnet $E^2$, and the angular position of the armature with respect to magnet $E^1$ will be such that at the end of the return movement of the magnet on its second reciprocation the armature arm 112 will be moved back beyond its normal point of rest.

So, also, if there is a deficiency of residual chlorine in the water being tested, the critical illumination of the cell A will be reached with a lesser angular movement of the rheostat and magnet $E^1$ and the armature will be picked up by the magnet $E^1$ on its second reciprocation after a lesser angular movement of the magnet than that at which the armature was stopped by the energization of magnet $E^2$ on the first reciprocation of $E^1$ will be such that the end of the forward movement of the second reciprocation of the magnet, the armature arm 112 will be carried beyond the angular position to which it is normally carried.

The chlorine supply apparatus by which chlorine gas is supplied to the flowing water to be treated, and which in the complete apparatus shown in automatically controlled to vary the rate of supply of chlorine according to the results of comparative tests of the amount of residual chlorine in the treated water, may be of any suitable character. It may, for example, be such an apparatus as is described in United States patent of Charles F. Wallace No. 1,514,939, having, as shown in Fig. 8, a rod 120 by endwise movement of which the rate of supply of chlorine may be varied.

As shown, automatic adjustment of the rod 120 is accomplished by means of an electric motor 121, which, through suitable reduction gearing, drives a pinion 122 by which a rack 123 connected to the rod 120 is moved to affect the required adjustment of the rod. The motor may be a reversible motor of any suitable type. The drawings show a reversible direct current motor which is supplied with current from a suitable source represented as a battery 124 connected to the motor through a reversing switch 125 by means of wire $d^1$ and $d^2$ between the motor and the switch, and $d^3$ and $d^4$ between the switch and the battery. The reversing switch is located at one side of the controlling magnets $E^1$ and $E^2$ and is adapted to be operated by the armature arm 113.

The switch may be of any suitable construction. As shown in Fig. 2, it comprises two pairs of normally open circuit-closing devices 126 and 127 which are connected by wires $d$. The circuit-closing devices 126 and 127 each comprises two movable contact members $e$ and $e^1$ respectively. The contact members $e$ have engaging portions which extend in position to be engaged by the arm 113, if on a return movement of the magnet $E^1$ the arm 113 is carried beyond its normal position of rest, and similarly the contact members $e^1$ have engaging portions which extend in position to be engaged and moved to close circuit by the arm 113 if at the end of a forward movement of the magnet $E^1$ the arm is given an over movement beyond the position to which it is moved if its total movement from its normal position of rest is greater than the forward reciprocating movement of the magnet. The circuit wires $d^1$ and $d^2$ are connected to the movable contact members of the circuit closing device 126, and the circuit wires $d^3$ and $d^4$ are connected to the stationary contact members of the circuit-closing device 127. When the contact members $e$ of the circuit-closing device 126 are moved by the arm 113 to circuit-closing position, circuit is closed from the battery through wires $d^4$, $d^2$ to the motor and thence back through wires $d^1$, $d^3$. When circuit is closed by movement of the contact members $e^1$, connection between the battery and the motor is made in the reverse direction through wires $d^4$, $d^1$, $d^2$, $d^3$. The closing of the motor circuit by movement of the contact members $e$ of the device 123 causes the motor to operate in the direction to move the rod 120 downward, thereby increasing the rate of chlorine supply, and closing of a circuit by means of the contact members $e^1$ causes the motor to operate in the opposite direction and to move the adjusting rod to decrease the rate of supply.

The extent of each operation of the motor and the resulting amount of change in the rate of supply will in each case depend on the time during which the circuit is closed, and this in turn depends on the angular position of the armature arm 113.

The operation of the apparatus as a whole as so far described is briefly as follows: Assuming the timing shaft to be at rest following a cycle of operations, the container C will be filled with a sample of the treated water to be tested to which a fixed amount of ortho-tolidin solution has been added to develop color according to the amount of unconsumed chlorine in the water, and the container 55 of the transparency standard will be filled with a sample of the treated water taken at the same time as that in the container C but without any color-developing reagent, and the support 45 will be in position with the transparency standard D in line between the light source and the light-sensitive cell.

At the end of the period of rest, the circuit of the motor 20 will be closed by the contact arm 27 coming into engagement with the cam 25 and the timing shaft will begin to rotate. After the shaft 10 starts turning, the distributor 12 closes the light-sensitive cell circuit through the magnet $E^2$, and cam 11 operates shaft 90 to turn magnet $E^1$ and rheostat 85, and movement of the rheostat increases intensity of the light source B. When the light is sufficiently intense the cell A permits current to pass, by which magnet $E^2$ is energized and armature 111 which has been moving with the magnet $E^1$ is attracted and held stationary by magnet $E^2$. Magnet $E^1$ and rheostat 85 then complete their forward movement and return to starting or normal position, and distributor 12 opens the cell circuit, thereby interrupting the flow of current through cell A and through magnet $E^2$, residual magnetism of magnet E² continuing, however, to hold armature 111 stationary. Then, as the movement of the timing shaft 10 continues, cam 15 shifts the support 45 to move the transparency standard out and the solution container C into position between the light source and the light-sensitive cell, and cam 11 again operates shaft 90 to cause the second reciprocation of the rheostat and magnet E¹, and distributor 12 closes the circuit of the light-sensitive cell through magnet E¹. The light again increases in intensity, and when it is sufficiently strong to penetrate the colored solution in cell C with sufficient strength to illuminate the light-sensitive cell to the critical point the cell again passes current, causing the magnet E¹ to be energized and to attract armature 111 and thereafter during the balance of its second reciprocatory movement of this cycle of operations to carry the armature and its arm 113 with it.

The armature arm is thus stopped and held on the first reciprocation of magnet E¹ after an angular movement of the magnet corresponding to the transparency of the standard, and is picked up by the magnet E¹ on its second reciprocation after an angular movement corresponding to the degree of transparency of the solution in container C. These two angular movements will be the same if the transparency of the liquid in containers C, that is, the unknown, is the same as that of the standard. Otherwise, there will be between these two points or positions a definite angle of difference which will correspond to the difference in transparency between the unknown and the standard. If the degree of transparency of the unknown is less than that of the standard, showing a deficiency of residual chlorine in the treated water, the armature will be picked up by magnet E¹ on its second reciprocation after an angular movement less than the angular movement made by it on its first reciprocation before the armature was gripped and stopped by magnet E², and the angular relation between the armature and magnet E¹ will be such that at the end of the return movement of the second reciprocation of E¹ the armature arm will be moved beyond its position of rest and will engage and operate the contact members e of the reversing switch 125, thereby closing circuit to the motor 121 and causing the motor to operate to move the adjusting rod 120 in the direction to increase the rate of supply of the chlorine.

If, on the other hand, there is an excess of residual chlorine in the treated water so that the degree of transparency of the unknown is less than that of the standard, the armature will be picked up by magnet E¹ on its second reciprocation after an angular movement greater than the angular movement made by it on its first reciprocation before the armature was stopped by magnet E², and the angular relation between the armature and magnet E¹ will be such that at the end of the forward movement of the second reciprocation of E¹ the armature arm will engage and operate the contact members e¹ of the reversing switch and thereby cause the motor to operate in the direction to adjust the rod 120 to decrease the rate of supply of chlorine.

After the second reciprocation of the rheostat and the controlling magnets, the timing shaft 10 continues to turn to complete its revolution, and during this continued movement of the shaft the suction valve 13 opens to cause the containers C and 55 to be emptied and to be refilled with fresh liquid from the tank 60, and immediately thereafter the ortho-tolidin valve 14 opens momentarily to supply a measured amount of ortho-tolidin solution to the water in the container C. Then at the end of one revolution of the shaft 10 the circuit to the motor 20 is broken and the shaft comes to rest. After an interval determined by the timing mechanism, the shaft 10 is again turned by the motor 20 and the cycle of operations is repeated.

The timing of the shaft 10 may, of course, be varied largely. I have found it convenient and satisfactory to have each cycle of operations, produced by one complete revolution of the shaft 10, taken one minute, with intervals of from five to seven minutes between cycles. The time interval between cycles should be sufficient to permit the color to be fully developed by the ortho-tolidin solution or other reagent in the treated water in the container C.

The apparatus as shown is provided also with recording means for making a record of each comparative test of the treated water showing plus or minus deviation of the residual chlorine content of the water from the desired content represented by the standard, such record showing also, most desirably, approximately the proportionate amount of such deviation. If testing apparatus according to the invention is not provided with means for automatically regulating the rate of supply of chlorine or other treating reagent, such recording means, or other non-recording indicating means, may serve as the basis for manually regulating the rate of supply of the treating agent to maintain a constant or approximately constant residual content.

Various different types of recording apparatus might be used. The apparatus shown is adapted to make a record on a sheet by drawing two parallel lines across the sheet for each comparative test, the length of one line being determined by the standard and that of the other by the unknown, and the greater length of one line over the other representing the difference in transparency between the standard and the unknown, and, therefore, the deviation of the amount of content of chlorine or other substance in the fluid being tested from that desired.

As shown in the drawings, see especially Fig. 9, the record sheet 130 is drawn from a suitably supported roll 131 by means of feed rolls 132 and 133. The roll 133 from which the end of the sheet drops downward serves also as a platen for supporting the sheet at the point of marking. The roll 133 is driven from the shaft 10 through a worm 134 and worm gear 135. The paper is thus fed intermittently, that is, only during each cycle of operations of the testing apparatus. A marking pen 140 is mounted at one end of an armature rod 141, the other end of which is adapted to reciprocate within a cylindrical electromagnet 142 carried by a slide 143 mounted to move on rods 144 extending parallel to the roll 133. The slide is given a movement corresponding to the movement of the rheostat 85 by means of a cable 145 connected to the slide and one end of which extends to a pulley 146 on the shaft 90 and the other end of which runs over a pulley 147 and carries a weight 148.

The slide 143 makes two complete reciprocations in each cycle of operations of the apparatus, being moved to the left in Fig. 9 at each forward reciprocation of the rheostat, and on the return movement of the rheostat being returned to its starting position, which is to the right of the position shown in Fig. 9. A spring 150 tends to move the armature rod 141 to carry the pen 140 into marking engagement with the paper. When the magnet is connected in a relay circuit g1, g2, g3 supplied with current by a battery 151 and controlled by a relay 152 connected in the circuit of the light-sensitive cell. Normally the relay circuit is open, but when current flows through the light-sensitive cell the relay 152 operates to close the relay circuit, causing the magnet 142 to be energized and to withdraw the pen 140 from contact with the paper.

During each rotation of the timing shaft 10 the roller 133 is driven to feed the paper. When the shaft starts, the magnet then being in its extreme right-hand position, as viewed in Fig. 9, and the pen being in marking contact with the paper, the magnet and pen are first moved to the left during the first forward reciprocation of the rheostat 85, and the pen marks a line on the paper until sufficient light is passed through the transparency standard D to cause the cell A to pass current. The relay 152 then operates to close the relay circuit, and the magnet 142 immediately withdraws the pen from contact with the paper. The movement of the magnet and pen to the left then continues during the remainder of the forward reciprocation of the rheostat and on the return movement of the rheostat the magnet moves to the right back to its starting position. Before reaching the end of its movement to the right, however, a finger 153 extending downward from the armature rod 141 passes beyond the end of a guide 154 and the armature rod is drawn further back by the magnet so that on the return movement the finger 153 will ride on the side of the guide 154 toward the magnet and thereby hold the pen retracted from the paper after the relay circuit is broken and the magnet de-energized.

Then during the second forward and return reciprocation of the rheostat 85 the above operation is repeated and again the line being traced by the pen is terminated by the withdrawal of the pen when the light-sensitive cell passes current as the result of being critically illuminated by light passed through the container C filled with the colored treated water. The length of this second line will bear a relation to the length of the first line corresponding to the transparency of the unknown to that of the standard, and the difference in the length of the two lines will indicate an excess or deficiency of residual chlorine in the water, greater length of the second line indicating excess, and lesser length of the second line indicating deficiency. Also the amount of the difference in length between the two lines will be approximately proportional to the amount of such excess or deficiency.

I have found that the current passed by a photo-electric glow tube in my apparatus is sufficient for energizing the magnets $E^1$ and $E^2$ directly. Obviously, however, a relay might be used for obtaining more powerful operating current, or the apparatus might be provided with any suitable amplifying means for amplifying the effect of the current from the cell. It will be understood that certain features of the invention are not limited to the use of a photo glow tube, and, further, that the apparatus shown and to which the foregoing description is largely confined, may be changed in many respects, and that the invention is not limited to the particular apparatus shown but includes changes and modifications thereof within the claims.

What I claim is:

1. Apparatus for controlling the application of chlorine gas to flowing water, comprising a photoelectric glow tube; means for subjecting the glow tube to the action of two physical quantities, namely, means for impressing a voltage on said tube and a light source for directing a beam of light on the tube; means operative at intervals for interposing successively between the light source and the tube (a) a sample of the treated water to which a color-developing agent has been added and (b) a standard; movable means for progressively increasing one of said physical quantities during the time that each of said members, namely, the sample and the standard, is interposed between the light source and the tube; means for measuring the difference between the movements of said movable means to the point at which the tube passes current under the influence of light transmitted through the sample and under the influence of light transmitted through the standard respectively; and means for controlling the rate of chlorine supply to the flowing water controlled according to such measured difference to maintain the residual chlorine content of the treated water constant.

2. Apparatus for controlling the application of chlorine gas to flowing water, comprising a photo-electric glow tube, means for impressing a voltage on said tube, an electric lamp for directing a beam of light toward the glow tube, means operative at intervals for interposing successively between the lamp and the glow tube (a) a sample of the treated water to which a color developing agent has been added and (b) a standard, a movable light controlling means for progressively increasing the illumination of the cell by the lamp after the standard and after the sample has been so positioned, and means moved in correspondence with the light controlling means and controlled by current passing through the cell for measuring the difference in transparency between the standard and the sample, and means for controlling the rate of chlorine supply to the flowing water controlled according to such measured difference to maintain the residual chlorine content of the treated water constant.

3. Apparatus for use in controlling the application of a treating agent to flowing water, comprising a photo-electric glow tube, means for subjecting the glow tube to the action of two physical quantities, namely, means for impressing a voltage on said tube and a light source for directing a beam of light on the tube; means operative at intervals for interposing successively between the light source and the tube (a) a sample of the treated water and (b) a standard; movable means for progressively increasing one of said physical quantities during the time that each of said members, namely, the sample and the standard, is interposed between the light source and the tube; means for measuring the difference between the movements of said movable means to the point at which the tube passes current under the influence of light transmitted through the sample and under the influence of light transmitted through the standard respectively; and indicating means for showing such difference.

4. Apparatus for testing water to determine the amount of a substance therein, comprising a photo-electric glow tube, means for subjecting the glow tube to the action of two physical quantities, namely, means for impressing a voltage on the said tube and a light source for directing a beam of light on the tube, means for interposing successively between the light source and the tube a sample of the water and a standard, movable means for progressively increasing one of said physical quantities during the time that each of said members, namely, the sample and the standard, is interposed between the light source and the tube, and means for measuring the difference between the movement of said movable means to the point at which the tube passes current under the influence of light transmitted through the sample and the point to which it turns under the influence of light transmitted through the standard respectively.

5. Apparatus for testing water to determine the amount of a substance therein, comprising a photo-electric glow tube, means for impressing a voltage on said tube, means for directing a beam of light toward the glow tube, means for interposing successively between the source of light and the glow tube a sample of the water to be tested and a standard, movable light controlling means for progressively increasing the illumination of the cell after the standard and after the sample have been so positioned, and means moved in correspondence with the light-controlling means for indicating the difference in transparency between the standard and the sample.

JOHN C. BAKER.